Oct. 28, 1941.     W. S. HALSTEAD     2,260,315
RADIO TRAFFIC CONTROL SYSTEM
Filed Sept. 1, 1938     7 Sheets-Sheet 1

INVENTOR.
WILLIAM S. HALSTEAD
BY John B. Brady
ATTORNEY.

Oct. 28, 1941.          W. S. HALSTEAD          2,260,315
                    RADIO TRAFFIC CONTROL SYSTEM
            Filed Sept. 1, 1938          7 Sheets—Sheet 3

INVENTOR.
WILLIAM S. HALSTEAD
BY John B. Brady
ATTORNEY

Oct. 28, 1941.    W. S. HALSTEAD    2,260,315
RADIO TRAFFIC CONTROL SYSTEM
Filed Sept. 1, 1938    7 Sheets—Sheet 4

WILLIAM S. HALSTEAD
INVENTOR

BY John B. Brady
ATTORNEY

Oct. 28, 1941.                W. S. HALSTEAD                2,260,315
                        RADIO TRAFFIC CONTROL SYSTEM
                Filed Sept. 1, 1938          7 Sheets-Sheet 5

FIG. 15

WILLIAM S. HALSTEAD
INVENTOR

Oct. 28, 1941.                W. S. HALSTEAD                2,260,315
                        RADIO TRAFFIC CONTROL SYSTEM
                    Filed Sept. 1, 1938         7 Sheets-Sheet 6

WILLIAM S. HALSTEAD
INVENTOR

BY *John B. Brady*
ATTORNEY

FIG. 19

Patented Oct. 28, 1941

2,260,315

UNITED STATES PATENT OFFICE 2,260,315

RADIO TRAFFIC CONTROL SYSTEM

William S. Halstead, Huntington, N. Y., assignor of one-third to John B. Brady, Washington, D. C.

Application September 1, 1938, Serial No. 228,051

8 Claims. (Cl. 177—337)

This application is a continuation-in-part of my copending application Serial Number 42,703, filed September 28, 1935, now Patent 2,131,042, granted September 27, 1938.

My invention relates in general to radio signaling or traffic control systems and is more particularly concerned with means effecting directional electric wave signalling along specific traffic lanes.

It is a primary object of this invention to provide means for effecting directional propagation of electric wave energy in correlation with a vehicle traffic control or signalling system.

It is a further object of my invention to provide a construction of high frequency signaling equipment which may readily be mounted on vehicles or conventional types of traffic control devices such as signal light housings without alteration of such devices.

Other and further objects of my invention reside in the constructional and circuit arrangements for selecting a particular plane of polarization and for controlling the direction of propagation of radiant wave energy in accordance with the operation of a correlated vehicle signaling system as set forth in the specification hereinafter following and by reference to the accompanying drawings in which:

Figures 1, 2, 3:
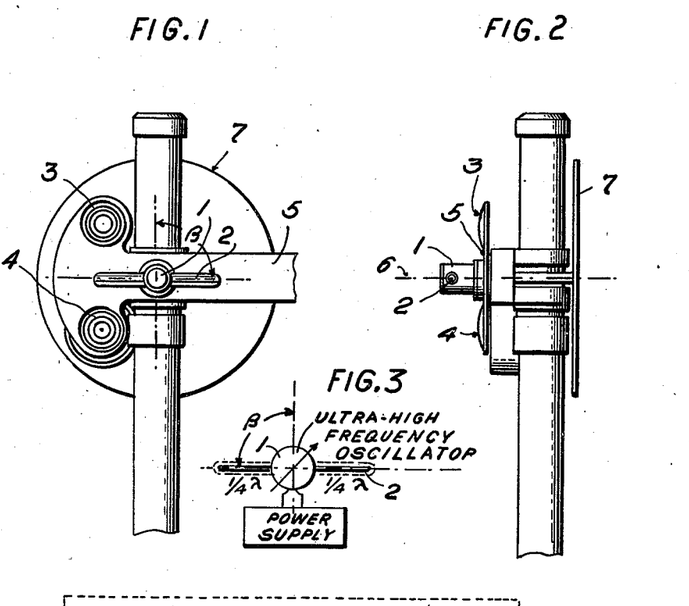
Figure 1 is a front elevational view of a railroad signal semaphore and light system with support therefor, depicted herewith to illustrate one embodiment of my invention, showing the ultra high frequency radio wave generator or oscillator, and associated dipole antenna unit included in my invention mounted on the movable signal semaphore arm to effect angular displacement of the longitudinal axis of the dipole antenna with a corresponding angular movement of the semaphore arm, thereby effecting changes in the polarization characteristics of the emitted radio wave in accordance with correlated changes in the character of the railroad signal.
Fig. 2 is a side elevational view of the same signal semaphore with the ultra high frequency oscillator and dipole antenna disposed in the position shown in Fig. 1.
Fig. 3 is an elementary schematic diagram of the ultra high frequency oscillator and dipole antenna, illustrating the degree of angular rotation effected by the longitudinal axis of the antenna in accordance with similar angular changes in the signaling positions of the semaphore arm, thereby effecting changes in the polarization characteristics of the emitted wave.

Referring to the drawings in detail, wherein like reference characters indicate corresponding parts throughout the several views, each form of the invention illustrated herewith embodies quasi-optical wave generating means such as provided by an ultra high frequency, radio oscillator, shown at 1, Figs. 1 and 2, combined with a directional polarized wave radiator, such as a dipole antenna 2 to operate in combination with and in correlation with the traffic control signals of a railroad, automobile or other signal system employing lights of different colors such as provided by lenses 3 and 4, a moving semaphore arm 5, or other signaling media to effect transmission of traffic control signals to the interior of locomotives, automobiles or other moving bodies equipped with ultra high frequency signal receiving and indicating means embodied in the system of the invention.

In the particular embodiment of the invention shown in Fig. 1, the ultra high frequency oscillator 1, and the dipole radiator 2, are assembled as a single coaxial unit, the unit being so disposed on the semaphore arm 5, that a common rotational axis 6, is effected, as is illustrated in Figs. 1 and 2. A metallic shield 7, may be employed behind the semaphore and ultra high frequency oscillator unit as shown to effectively prevent the transmission of the ultra high frequency signal in a direction opposite to that of the projected light rays from the traffic signal.

In the particular embodiment illustrated herewith the shield 7, takes the form of a sheet metal disc, but it is obvious that other forms and types of shields or reflectors may be employed in lieu thereof. In the embodiment of the invention shown herewith ultra high frequency oscillator unit 1, is secured to the semaphore arm 5, so that when the arm is in the horizontal position shown in Fig. 1 the longitudinal axis of the dipole 2, also extends in the horizontal direction. It is evident, from the illustration of Fig. 1, that when the semaphore arm 5, moves upward through angle B towards a vertical position, the dipole 2, also moves through the same angle, as shown in Figs. 1 and 3.

In the particular embodiment of the invention depicted in Figs. 1 and 2 the heater and anode power supply for operation of the ultra high frequency oscillator may be provided by a storage battery and a small battery-driven alternator, illustrated in subsequent figures. Since no modulator or amplifier tubes need be employed in this particular embodiment of the invention wherein the oscillator is self-modulated by the alternator supply, the comparatively minute current drain of an intermittently-operating ultra high frequency oscillator permits extended operation of the ultra high frequency transmitter by a single storage battery.

As is well known in the radio art, an ultra high frequency dipole radiator when disposed in a horizontal position as shown in Fig. 1, will emit a radiant energy wave having horizontally polarized characteristics. If a horizontally disposed receiving dipole, shown at 8, Figs. 4 and 5, installed on the front of a locomotive, approaches the horizontally disposed and parallel transmitting dipole 2, Figs. 1 and 5, the associated ultra high frequency detector 9, will supply a received signal of maximum amplitude to amplifier 12, thereby effecting visual actuation of a "stop" signal indicator, such as a red neon light 13, and audible energization of loud speaker 16. Simultaneously, ultra high frequency detector 11, Fig. 4, connected to a vertically disposed dipole 10, installed on the front of the same locomotive, will deliver a signal of minimum amplitude to its amplifier 14, and a green signal indicator light 15, by reason of insufficient energization, will not be visibly actuated. When, on the other hand, the dipole radiator 2, as shown in Fig. 6 is in a substantially vertical position, corresponding to the vertical "go" position of the semaphore arm 5, the emitted ultra high frequency wave will have vertically polarized characteristics and the vertical receiving dipole 10, Fig. 6, will deliver maximum wave energy to its associated detector circuit 11, thereby effecting, as explained heretofore, the visual actuation of green light 15. Simultaneously, as explained heretofore, red light 13 will not be visibly actuated. Novel means are thus provided by which discrimination between two ultra high frequency traffic control signals is effected by virtue of differences in the plane of polarization of the ultra-high frequency radio wave, each plane of polarization being correlated with a particular signal of the traffic controlling semaphore.

Figure 4:
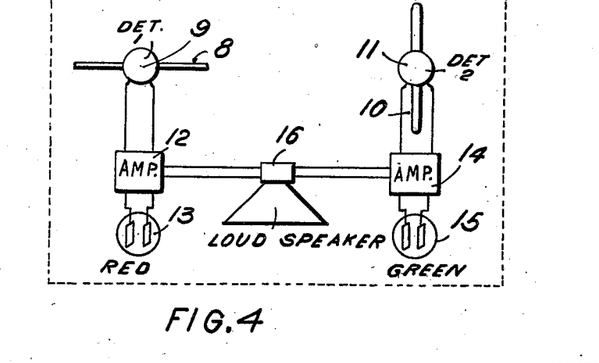
Fig. 4 is an elementary schematic diagram of one form of polarized microwave radio receiver and associated signal indicating system embodied in my invention for use in cooperation with the polarized ultra high frequency transmitter of the preceding figures, and shown herewith to aid in illustrating the principle of operation of the system and devices of my invention.
Figures 5, 6:
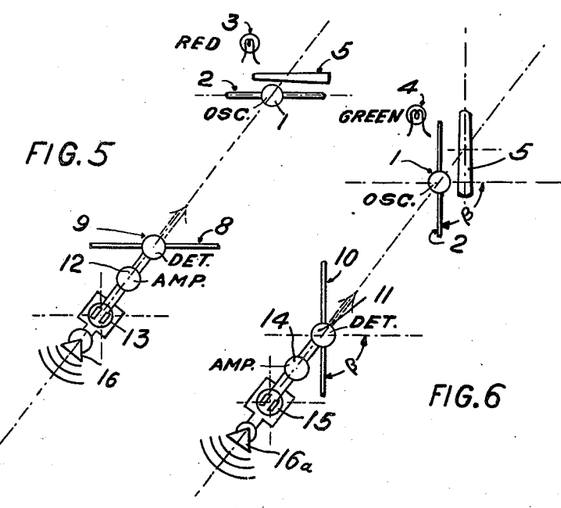
Fig. 5 is a schematic diagram in simple isometric projection, to illustrate the operative co-ordination between the horizontal position of the dipole antenna when the semaphore arm is in the horizontal "stop" position, and the horizontal receiving dipole connected with an ultra high frequency detector and signal indicating device installed in a moving vehicle, to give visual and audible indication therein of the character of the semaphore signal.
Fig. 6 is a schematic diagram of the vertical receiving dipole with associated detector and signal indicator shown in Fig. 4, illustrating the effective reception of a vertically polarized ultra high frequency signal by the vertical receiving dipole when the transmitting dipole is in an approximately vertical position corresponding to the vertical or "go" position of the semaphore arm, as will be explained hereinafter.

In addition to the selective actuation of visual signals 13 and 15 as described heretofore, loud speaker 16, shown in Fig. 4, connected to the amplifiers 12 and 14, will emit an audible warning signal in the cab of the locomotive to inform the driver of the proximity of a signal ahead of the train. As long as the locomotive equipped with the ultra high frequency receiving apparatus embodied in the invention is in front of the semaphore the ultra high frequency traffic signal will be received in the cab. Once the locomotive has passed the semaphore, however, there will be an abrupt termination of the signal in the cab since the uni-directional quasi-optical wave propagation characteristics of the antenna system limit its field to the area in front of the semaphore. The unique directional characteristics of the ultra high frequency system therefore preclude the possibility that a train proceeding in an opposite direction, for example, to the south, will receive the ultra high frequency signal intended for a northbound train. Should the southbound locomotive to be in front of the signal set for the northbound train, the shielding effect of the locomotive itself is sufficient to prevent the reception of the ultra high frequency signal by the receiver other than that for which the signal was intended, since it is assumed that the receiving dipole in each case will be installed at the front of the cab below the top of or on the front of the locomotive.

It is pointed out that ordinary short wave radio transmitters and receivers would not efficiently effect the purpose of the present embodiment of the invention since short waves above several meters in wavelength lose many of the quasi-optical characteristics possessed by the ultra high frequency system. Moreover, the size of an efficient antenna required by a transmitter operating on wavelengths above several meters would be sufficiently great to preclude its installation and use as described in connection with the present embodiment of the invention. It will be understood therefore that the illustrative embodiment of my invention is intended for operation with ultra high frequency waves of approximately 10 cm. to 1 m. in length, which have the quasi-optical characteristics prescribed.

In this connection also it might be noted that limitation of the range of the ultra high frequency transmitter is effected quite simply, and largely for the reason that the radiation pattern of the particular type of low power transmitter involved has comparatively sharp termination fringes. The limits of the radiation pattern for the transmitter in any location are determined and regulated with a standard receiver adjusted to effect light control above a certain threshold signal value. Thus, only receivers within a definitely limited area with respect to the transmitter will respond sufficiently to effect the desired control function. In addition, as shown hereinafter, controlled relays responsive only to a single maximum signal and not to other signals of lesser intensity, which might be received at the same time may be used in the receiver to insure reception of the proper traffic signal.

Figures 7, 8:
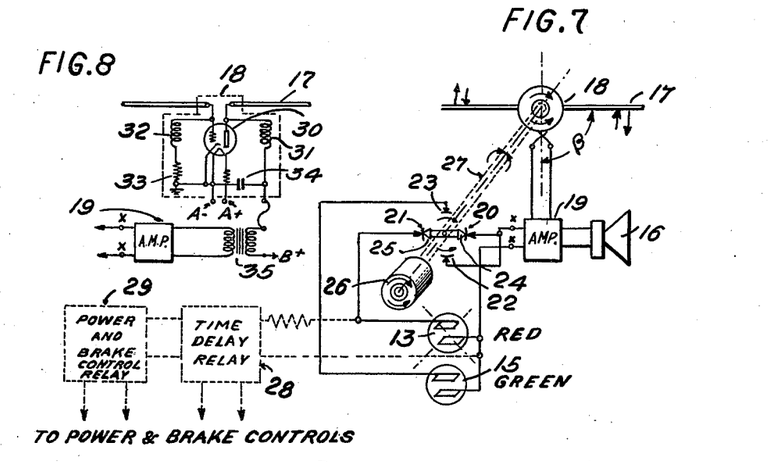
Fig. 7 is a schematic diagram of one embodiment of ultra high frequency radio receiving system, installed in the cab of a locomotive or other moving vehicle, which employs automatic means to change the angular position of the longitudinal axis of the receiving dipole with respect to the position of the transmitting dipole, and simultaneously to select particular segments of a commutator operatively coordinated with particular positions of the receiving dipole, thereby providing selective control of signal lights in the vehicle, or automatic power and brake control if desired, in accordance with the character of the semaphore signal as will be explained hereinafter.
Fig. 8 is a circuit diagram of one form of ultra high frequency detector circuit employed in a receiving system of the type shown in Fig. 7.

In a modification of the ultra high frequency receiving system, heretofore described, the means shown in Fig. 7 may be employed to effect selection of red or green signal indicators 13 and 15, respectively. In this modification a single dipole antenna 17, which may be moved back and forth through angle B, is used. A detector 18 and an amplifier 19, whose output is connected as shown through opposite and coacting commutator segments 20—21 and 22—23, respectively, and movable segment selecting brushes 24 and 25, to red and green lights 13 and 15, respectively. An electric motor 26, may be employed to slowly rotate through angle B insulated shaft 27 to which are secured brushes 24 and 25, and the dipole antenna 17. When read in connection with the foregoing description of the manner of operation of the system and the illustrations of Figs. 5, 6 and 7 in particular, it will be understood that when the receiving dipole 17, of Fig. 7 is in the horizontal position a horizontally polarized ultra high frequency signal from a horizontal transmitting dipole will be received with maximum intensity by detector 18, and associated amplifier 19, rendered audible by loud speaker 16, and by virtue of the disposition of the commutator segment selective brushes 24 and 25 which effect electrical contact between segments 20 and 21, the signal lamp 13, correlated with segments 20 and 21 will be energized and visually actuated. It is evident from the diagram of Fig. 7 that so long as the commutator segment selective brushes 24 and 25 provide contact between coacting segments 20 and 21, only the red lamp 13, can be actuated, since no electrical contact is effected between segment 22, and segment 23, which is connected to the green lamp 15. When the receiving dipole 17 is rotated through an angle B to the vertical position, the received signal from the horizontal transmitting dipole 2, will be of minimum intensity in the detector circuit, and consequently neither signal indicator lamp 13 nor 15, will be actuated. Inasmuch as the receiving dipole is slowly moved back and forth through angle B, the operator of the locomotive will see intermittent flashes of red light 13 in the cab as the locomotive approaches the semaphore set in the horizontal stop position. On the other hand, if the semaphore arm and associated transmitting dipole are set in the vertical or "go" position, detector 18 will receive the vertically polarized ultra high frequency signal with maximum intensity when the receiving dipole 17 is in the vertical position. Electrical contact simultaneously is made between coacting segments 22 and 23, thereby providing energizing voltage for the green indicator light 15. The red light 13, will not be energized so long as the semaphore arm is in the vertical position, since substantially no effective signal will be received by detector 18 when the receiving dipole 17 is in a horizontal position, thereby precluding the possibility of energizing the red light 13 sufficiently for its visible actuation.

Figure 12:
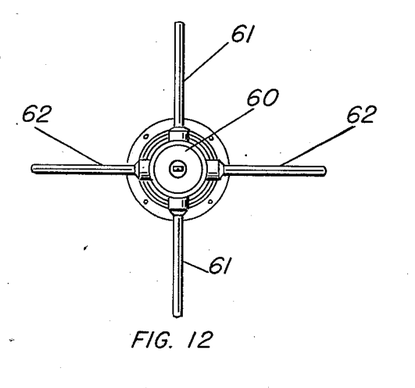
Fig. 12 is a plan view of a modification of the ultra high frequency oscillator and antenna unit shown in Fig. 9.
Figure 13:
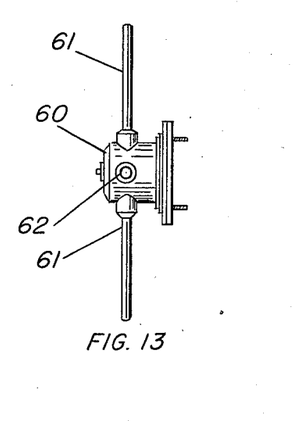
Fig. 13 is a side elevational view of the device shown in Fig. 12.

It is obvious that many modifications of the principle of operation of the system heretofore described are possible within the scope of the invention. In lieu of the movable dipoles as described, fixed dipoles extending at right angles to each other may be employed as shown in the construction of Figs. 12 and 13. In the transmitting unit the particular dipole coordinated with the "stop" and "go" positions of the signal arm or the corresponding red and green lights is automatically energized as shown in the circuit diagram of Fig. 14. In the receiving unit signal selection is effected by sustained energization of one of two detector units connected, respectively, to the horizontal and vertical dipoles as shown in Fig. 15. In this case, each detector is connected to its associated tuned amplifier which in turn is connected to its tuned relay and correlated signal light mounted within the cab. It is obvious that in a modification of the double detector system shown in Fig. 15, signal selection may also be effected by intermittently connecting each of the dipoles to a single detector and simultaneously providing connection with the signal indicating devices associated with a particular dipole. It is also obvious that the received signal may be used to automatically actuate the power and brake control system of the train as is schematically illustrated in Figs. 7 and 15 by provision of a timing device 28, connected with a power and brake control relay 29, both shown connected to the circuit of "stop" indicator lamp 13. Means are thus provided by which a train may be automatically stopped within a predetermined time after it has passed a stop signal.

Figure 9:
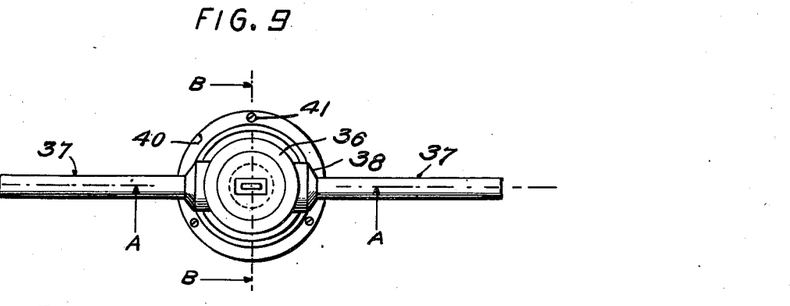
Fig. 9 is a plan view of one form of ultra high frequency oscillator and dipole antenna unit, enclosed in a weatherproof housing, as embodied in my invention.
Figure 10:
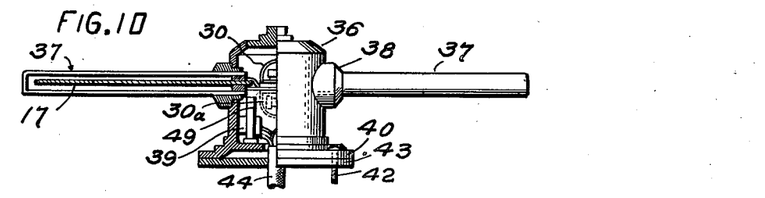
Fig. 10 is a front elevational view of the device shown in Fig. 9, a vertical cross section being taken along lines A—A and B—B as shown, to illustrate the preferred arrangement of parts within the protective housing of said oscillator and dipole antenna.
Figure 11:
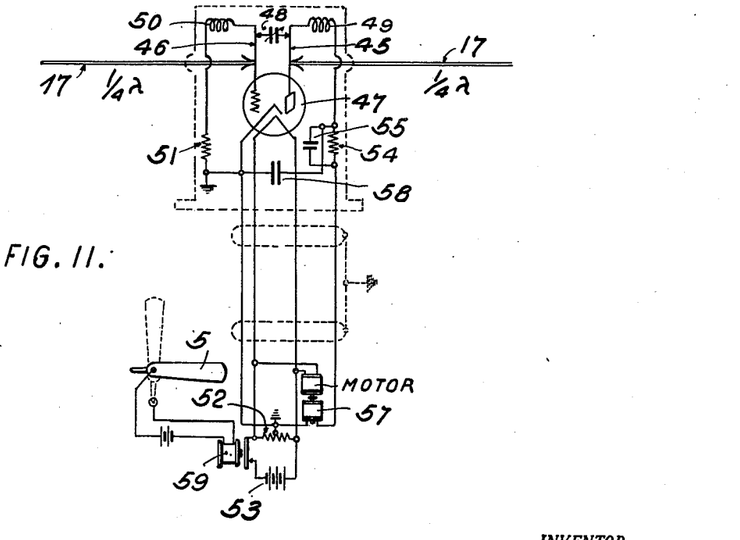
Fig. 11 is a circuit diagram of the ultra high frequency oscillator and dipole antenna embodied in the unit shown in Figs. 9 and 10.

The mechanical arrangement of both ultra high frequency detector unit and transmitting unit may be identical if desired. One preferred mechanical arrangement of an ultra high frequency receiving or transmitting unit is shown in Figs. 9 and 10 in which a cylindrical weatherproof housing 36, fabricated of porcelain, glass, Bakelite or other suitable material, is provided to completely enclose ultra high frequency tube 30 used as an ultra high frequency detector in this case, and its associated detector circuit elements, such as chokes 31 and 32, resistor 33, and other parts. The dipole antenna 17, also is enclosed in a weatherproof cylindrical housing 37, fabricated of nonconducting material such as porcelain, glass or other suitable material, which is secured to the housing 36, by means of insulating bushings or sleeves 38. A resistor 39, Fig. 10, may be employed if desired to provide sufficient heat to the interior of the dipole and tube housing to prevent formation of excessive accumulations of ice or moisture, the assembled unit being so constructed that warm air from the interior of tube housing 36, may circulate within the dipole housing 37. In the preferred arrangement illustrated herewith, the tube 30, is so disposed in the central portion of housing 36, that the anode and grid leads are substantially in line with the ends of the dipole thereby effecting a highly desirable symmetrical and compact disposition of all parts carrying ultra high frequency currents. It will be observed from the illustrations that the longitudinal axis of the cylindrical housing 36, and that of the tube 30, coincides, and that the longitudinal axis of the dipole antenna intersects that of the tube housing at a point substantially in line with the base of the ultra high frequency tube. A mounting flange 40, provided with holes 41, through which screws 42, may be inserted, provides means by which the receiving unit may be secured to a coacting flange, not illustrated, on motor shaft 27, or means by which a similarly constructed transmitting unit may be secured to semaphore arm 5. A water-tight washer or disc 43, may be placed between the flange 40, and the coacting flange to effectively render a completely water-tight unit. The leads for the unit may preferably be brought out through an opening at the center of the water-tight washer 43. Since the unit need only be moved through an angle of 90 degrees or less, a flexible cable 44, may be employed to effect connections between the ultra high frequency unit and the associated apparatus. In the transmitting unit, provision may be made for mounting an additional ultra high frequency tube 30a, shown in dotted lines, directly below tube 30 as illustrated in Fig. 10. The two tubes may be thus arranged in a symmetrical parallel electrical connection, so that the current flow through the tubes is divided and the operating life thereby prolonged. Further, in the event of heater failure of one tube the second tube will ordinarily continue to generate sufficient radio frequency energy to effect the operative functions of the system. One preferred circuit for the generation and radiation of polarized ultra high frequency energy is illustrated in Fig. 11 in which the two quarter wave sections of a dipole 17, are connected to the anode and grid circuits, 45 and 46, respectively of the oscillator tube 47. A variable condenser 48, may be employed between the grid and anode circuits as shown to effect a degree of tuning. Anode and grid choke coils 49 and 50, respectively, are connected in series in the anode and grid leads of the oscillator tube as indicated. A resistor 51, is connected in series between the grid choke 50 and ground. The cathode of tube 47 is connected to the grounded center tap of resistor 52, shunted across heater battery 53, or other source of E. M. F. A resistor, 54, and shunting condenser 55, are connected in series between choke 49, and an output terminal of alternator 57, or other suitable source of anode E. M. F. A by-pass condenser 58, is connected between the anode side of resistor 54, and the cathode to complete the circuit. A relay 59, may be placed in series in one lead of battery 53 so as to effect on and off control of the transmitter in accordance with the operation of the railroad semaphore. It is evident that batteries need not be employed to supply the necessary power for the operation of the ultra high frequency transmitter since such power may be derived in any well known manner from connections with a lighting main or other power source.

Figure 14:
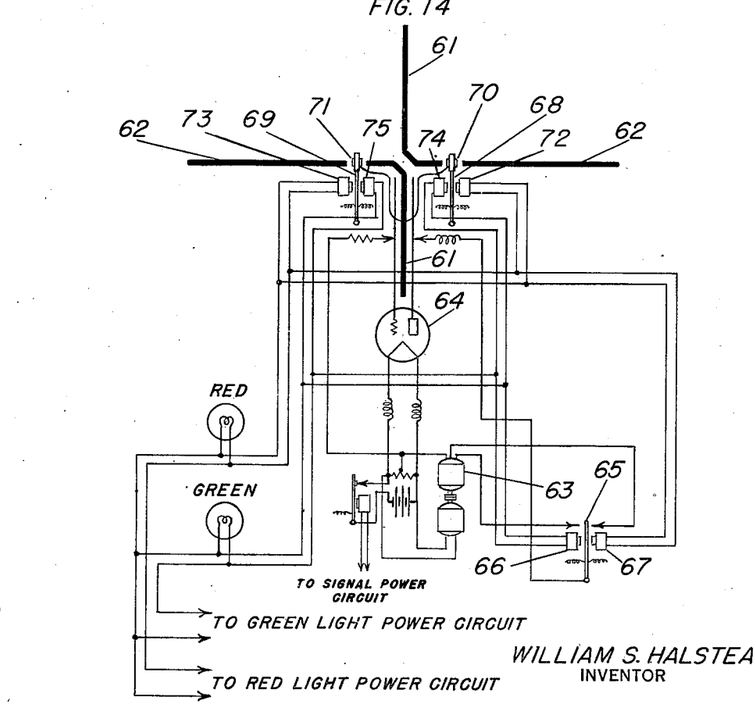
Fig. 14 is a circuit diagram of the antenna system, and the ultra high frequency oscillator circuit embodied in the unit shown in Figs. 12 and 13.
Figure 15:
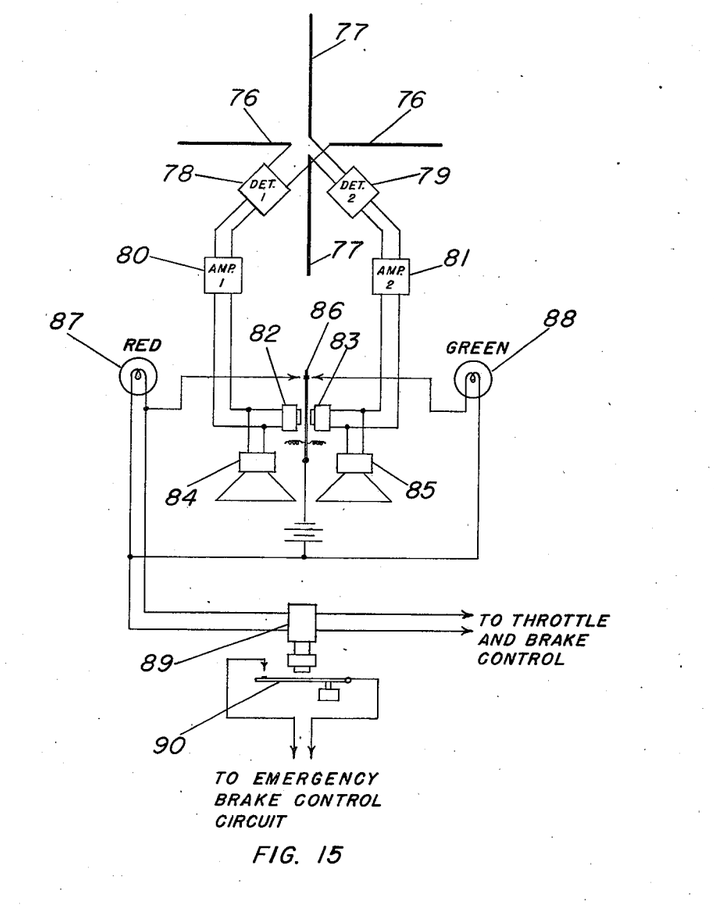
Fig. 15 is a circuit diagram of an antenna system, ultra high frequency receiver, and relay-controlling circuits employed on a vehicle for the purpose of selectively energizing a given signal light.

In the modification of the invention as shown in Figs. 12, 13 and 14, the housing 60 for the ultra high frequency oscillator is designed to hold a vertical dipole 61, and a horizontal dipole 62, in fixed right angle relationship to each other. Otherwise the general construction is similar to that shown in Figs. 9 and 10. The unit is designed to be mounted on a standard signal tower or post for electrical connection with the power and signaling circuits already installed.

A circuit diagram of the oscillator and automatic antenna selecting means is shown in Fig. 14. The oscillating circuit is similar to that already described in connection with Fig. 11 with the exception that the antenna coupling is of the inductive type rather than direct as previously shown. In order to effect maximum discrimination between transmitted "stop" and "go" signals, the alternator 63, employed for modulating the oscillator tube 64 is provided with contacts for delivering anode voltage having either or two frequencies, such as 200 and 2000 cycles. Thus by combining the signal discriminating characteristics of vertically and horizontally polarized wave energy with modulation of the oscillator by a predetermined tone as described in my copending application of which this is a continuation-in-part, highly effective and reliable means are provided for controlling the signal lights mounted within the locomotive approaching the transmitter. Transient changes in polarization of the radio wave due to the presence of metallic bodies in the path of the wave are thus rendered of minor consequence since the frequency discriminating characteristics of the receiver will prevent energization of the wrong signal light in the cab. In addition the wide tone discrimination between two such frequencies as 200 and 2000 cycles will provide the engine crew with audible signals having distinct individual characteristics.

Modulation of the oscillator 64, by either of the two frequencies is effected by movement of the armature 65, of a relay as shown in Fig. 14. Relay coil 67 is connected to the "stop" or red light signaling circuit, and relay coil 66, is connected to the "go" or green light circuit. Thus when the "stop" circuit is energized the armature is pulled towards coil 67, and the "stop" tone of alternator 63 is applied automatically to the plate of oscillator 64. When the "go" circuit is energized, the armature is pulled towards coil 66 and the "go" tone is applied to the plate circuit.

The polarization characteristic of the emitted radio wave is determined by the positions of relay armatures 68 and 69. When the insulated contacts 70 and 71 of armatures 68 and 69, respectively, are moved to the contacts at the ends of the two sections of the horizontal dipole 62, the wave emitted by the dipole is horizontally polarized. This function is performed automatically by application of current to relay coils 72 and 73 which are connected to the "stop" signaling circuit as shown. When the insulated contacts 70 and 71 are moved to the contacts at the ends of the two sections of the vertical dipole 61 by movement of armatures 68 and 69, the emitted wave is vertically polarized. Relay coils 74 and 75, connected to the "go" signaling circuit effect this control of movement of the armatures to the vertical dipole contacts. In this manner selection of the plane of polarization is effected without the necessity for rotation of the antenna as shown in previous figures.

In the modification of the receiver shown in Fig. 15, fixed horizontal and vertical dipoles 76 and 77, mounted on a housing similar to that of 60, Figs. 12 and 13, are employed to effect discrimination between planes of polarization of the transmitted radio wave. Ultra high frequency detector unit 78, similar to the detector shown in Fig. 8 and arranged within housing 60 in a manner similar to that shown in Fig. 10, is connected as shown to a tuned amplifier 80. This amplifier, which is tuned to favor the "stop" tone, and discriminate against other signals, is connected to coil 82 of a slow acting relay, and to loud speaker 84. Ultra high frequency detector unit 79 similar to unit 78 and arranged within the same housing is connected to tuned amplifier 81, which is tuned to favor the "go" tone and discriminate against other signals. The output circuit of amplifier 81 is connected to coil 83 of the relay and to the loud speaker 85.

If the incoming wave is horizontally polarized as radiated by the horizontal transmitting dipole associated with the "stop" signal detector 78 is provided with wave energy of maximum amplitude while simultaneously detector 79 receives wave energy of minimum amplitude. The rectified wave energy delivered by detector 78 to amplifier 80 will be greatly amplified if its frequency is that of the "stop" signal, and accordingly coil 82 of the associated relay will be energized and loud speaker 84 will be audibly actuated. If the signal is of a sustained nature, the armature 86, of the slow-acting relay will be pulled towards coil 82 with the result that red light 87 will be visibly energized. If the manual throttle and brake controls of the train are not applied by the engineer so as to stop the train within a predetermined time after the "stop" signal has been received, a time delay switch 89 of any conventional type will close. This will apply power to emergency train control relay 90 in any manner well known in train control art. Since it is the purpose of this invention to provide means whereby a control signal may be delivered inside the locomotive cab, it is not necessary here to describe in detail any of the conventional automatic train control devices which may be operated by the electric power made available by the closing of the relay associated with the red signal light.

If the incoming radio wave is vertically polarized detector 79 will deliver a signal of maximum amplitude to tuned amplifier 81. If the wave is modulated by the "go" signal, tuned amplifier 81 will greatly increase its wave energy and coil 83 will be energized sufficiently to move the armature 86, of the slow-acting relay to close the circuit of the "go" signal indicator, in this case a green light. At the same time loud speaker 85 is audibly energized. It is evident that duplication of loud speaker, and detector circuits need not be required in actual practice since one detector, and speaker unit can be arranged to perform the same duty by an adaptation of the antenna switching circuit shown in Fig. 14 and the connection of the loud speaker to both amplifiers.

It is pointed out that with the system disclosed herein, it is necessary that a sustained polarized radio wave modulated by a predetermined tone be received and favored by frequency discriminating devices before either of the visible signals in the cab can be operated. The slow-acting armature 86, of the signal selecting relay together with the frequency discriminating action of the tuned amplifiers provide protection against energization of the vehicle signal lights by interfering signals or transients.

In an additional modification of the system described in the preceding pages, utilization of the two antennas disposed at right angles to each other is effected in a horizontal plane for the purposes of controlling the movement of automobile traffic at intersecting streets. In this connection I refer to Figs. 12 to 17, particularly, of my copending application of which this is a continuation-in-part. In Fig. 12 I have illustrated the combination of a standard traffic signal with an ultra high frequency transmitter having a single dipole antenna disposed with its axis at right angles to the direction of traffic flow on the street in which radio control from the correlated radio transmitter is to be applied. The principle of selective response between receivers on intersecting streets is illustrated in Fig. 16 of the copending application in which it is shown that north-south bound vehicles equipped with horizontal dipoles extending parallel to the axles of each car will receive the radio traffic signal from transmitter 60 with maximum intensity because of the parallel relationship between the transmitting and receiving dipoles and because the receiving antenna on each north-south car is within the figure-of-eight radiation pattern of the transmitter. In the illustrated case, the radiation pattern extends in substantially figure-of-eight formation north and south from dipole 61, the axis of the dipole representing the convergence of the two lobes of the figure eight. Substantially no effective wave energy is radiated in an east-west direction. Thus vehicles proceeding east and west will not receive the signal intended for north-south bound cars because, first, the dipoles on the east-west cars are at right angles to transmitting dipole 61 in which position minimum signal is received, and second, the east-west bound cars are out of the effective radiation field of dipole 61 except within very short distances of the transmitter. To control traffic in the east-west lane, a second transmitter and light are installed on an adjacent corner as shown in the dotted lines of Fig. 16 of the copending application.

In the modification herewith described and shown in Figs. 16 to 19, inclusive, control of traffic on intersecting lanes is effected by the combination of two antennae on a single radio control transmitter, thus effecting a saving in the matter of equipment, installation expense and the amount of power consumed.

Figure 16:
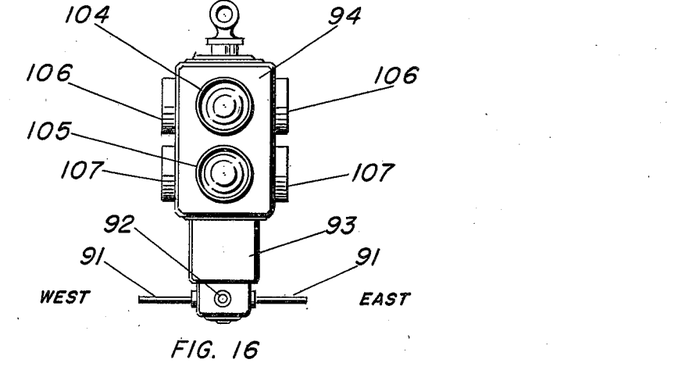
Fig. 16 is a front elevational view of a standard form of street traffic light housing provided with a modification of the radio signaling device shown in Figs. 12 and 13.
Figure 17:
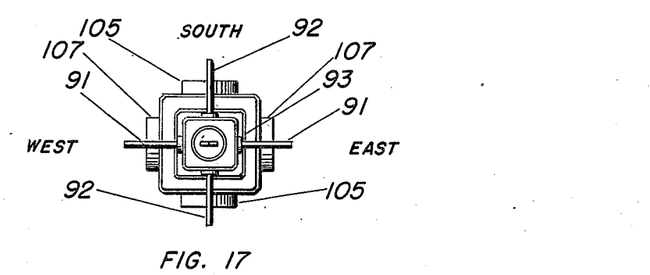
Fig. 17 is a bottom view of the traffic light housing and attached radio signaling device shown in Fig. 16.
Figure 18:
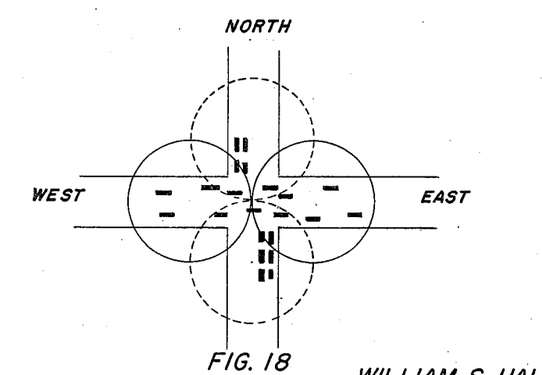
Fig. 18 is a plan view of a street intersection in which control of vehicles on intersecting routes is effected by the device of Figs. 16 and 17.

With reference to Figs. 16 and 17, one dipole 91 is disposed in an east-west direction on oscillator housing 93, mounted on the end of a standard traffic light housing 94. A second dipole 92 is disposed on the same oscillator housing in a north-south direction in a manner similar to that shown in the construction of Figs. 12 and 13 in the preceding part of this application. A distinction exists, however, in that the two dipoles are employed in this case in a horizontal plane to effect changes in the direction of propagation of the radio wave energy rather than to effect changes in the polarization characteristics of wave energy propagated in the same direction as previously outlined in this specification. The two radiation patterns from the two horizontal antennas disposed at right angles to each other are schematically shown in Fig. 18 in which the dotted figure-of-eight pattern represents the approximate pattern of radiation from dipole 91, and the solid line figure-of-eight pattern represents the approximate pattern of radiation from dipole 92. It is pointed out that these are idealized patterns which in actual practice are somewhat distorted in shape due to wave reflection and absorption effects. The actual patterns extend in north-south and east-west directions substantially as shown with maximum signal propagation in these directions.

Figure 19:
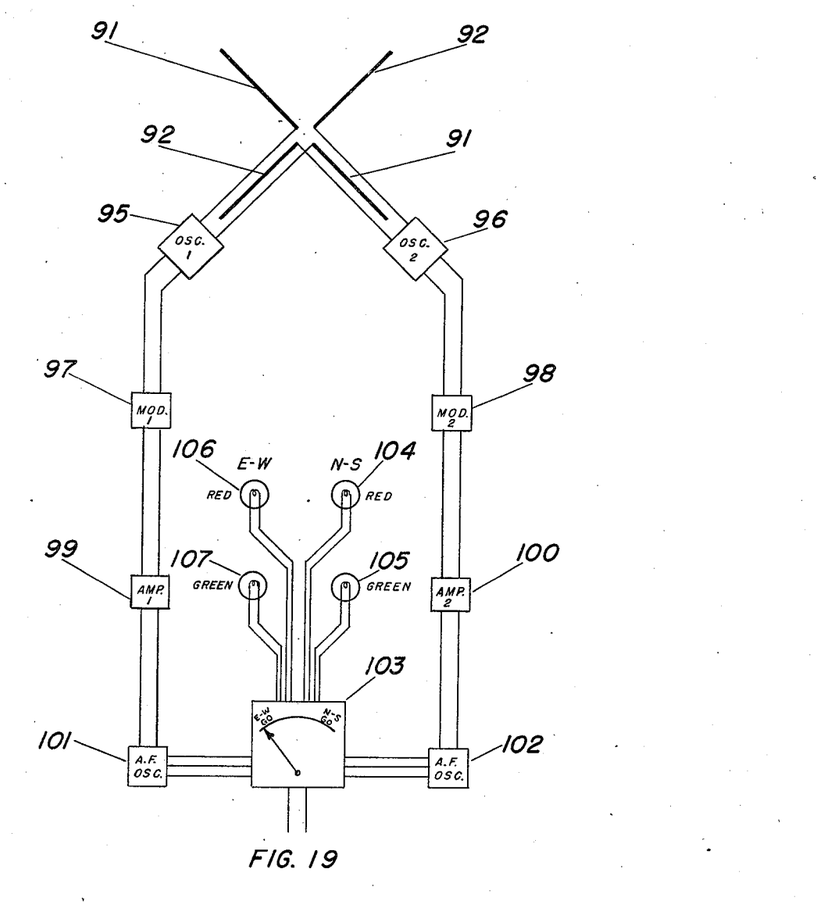
Fig. 19 is a schematic block diagram of the circuits employed in the device of Figs. 16 and 17.

The general arrangement of the oscillators within the housing 93, is similar to that previously shown in Fig. 10. The electrical circuits of each oscillator 95 and 96, Fig. 19, may be identical to that shown in Figs. 17 and 18 of the copending application. The associated modulating and control circuits shown in schematic form in Fig. 19, are also similar except for the distinction that two separate modulators 97 and 98, amplifiers 99 and 100, and control signal generators 101 and 102 are controlled by signal selecting unit 103.

Operation of the system is such that when north-south red lights 104 are energized, ultra high frequency energy modulated by the "stop" signal, is directed to the north and south by dipole 91. Simultaneously ultra high frequency energy modulated by the "go" signal is directed to the east and west by dipole 92. When east-west red lights 106 are energized, radio wave energy modulated by the "stop" signal is directed to the east and west by dipole 92 and wave energy modulated by the "go" signal is directed to the north and south by dipole 91. In each case, signal lights inside vehicles on the two lanes are controlled as previously described in my copending application.

It is obvious that the system may be simplified by the use of a single ultra high frequency oscillator and dipole switching means similar to those shown in Fig. 14. In this event the two dipoles would be connected intermittently at intervals of several seconds to the single oscillator circuit, the frequency of the modulating wave being changed in synchronism so as to effect control of traffic on the two intersecting lanes.

It will be recognized that the illustrative systems described herein are capable of considerable modification and rearrangement without departing from the spirit and scope of the invention, and it is therefore to be understood that the following claims embrace all such modifications and equivalent arrangements as may fairly be construed to fall within the scope of the invention.

What I claim as new and desire to secure by Letters Patent of the United States is as follows:

1. In a signalling system for controlling the flow of traffic in interfering lanes at a traffic intersection, an antenna structure comprising a pair of directional antennas mounted on a common housing, one of said antennas being disposed to effect production of a primary radiation pattern having a major lobe extending substantially in a longitudinal direction along one traffic lane, the second of said antennas being disposed to effect production of a primary radiation pattern having a major lobe extending substantially in a longitudinal direction along a second interfering traffic lane at said intersection, said antenna structure being disposed adjacent said traffic intersection, a carrier generator electrically connected to each of said antennas, means for modulating each of said carrier generators by a plurality of distinct predetermined audio frequency control signals corresponding to "stop" and "go" traffic indications, and traffic control relay switching means for effecting modulation of one of said carrier generators by a "stop" signal concurrently with modulation of the second carrier generator by a "go" signal for selective control of traffic flow in each of said interfering lanes.

2. In a signalling system for controlling the flow of traffic in interfering lanes at a traffic intersection, a carrier generator, a pair of directional antennas, one of said antennas being disposed to effect directional propagation of wave energy principally at the surface of one lane of traffic, the second of said antennas being disposed to effect propagation of wave energy principally at the surface of a second interfering lane of traffic, said antennas being disposed adjacent said traffic intersection, and switching means for sequentially applying carrier wave energy from said carrier generator to one or the other of said antennas to effect discrimination in direction of signalling in favor of traffic in one or the other of said interfering traffic lanes for selective control of traffic flow in each of said lanes.

3. In a signalling system for effecting directional electric wave signalling along interfering traffic lines at a roadway traffic intersection, an antenna structure comprising a pair of directional antennas mounted on a common housing, one of said antennas being arranged to effect discrimination in direction of signalling in favor of traffic on one lane at an intersection, the second of said antennas being arranged to effect discrimination in direction of signalling in favor of traffic on a second interfering lane at said intersection, said antenna structure being disposed substantially adjacent said intersection, and electric wave signalling apparatus electrically connected to said antennas and disposed adjacent to said housing in fixed relationship thereto.

4. In a traffic signalling system for effecting directional electric wave signalling along interfering traffic lanes at a roadway traffic intersection, an antenna head comprising a housing having antenna supporting means thereon, a pair of antennas mounted on said housing, one of said antennas having a major horizontal axis extending in a direction substantially normal to one lane of traffic at an intersection, the other of said antennas having a major horizontal axis extending in a direction substantially normal to a second interfering lane of traffic at said intersection, the position of the axes of said antennas being a factor in effecting discrimination in direction of signalling in favor of traffic on one or the other of said lanes, and electric wave signalling apparatus disposed adjacent to said housing in fixed relationship thereto, and electrically connected to said antennas.

5. In a traffic signalling system for effecting directional electric wave signalling along interfering lanes at a traffic intersection; an antenna head comprising a housing having antenna supporting means thereon, a pair of horizontal dipole antennas mounted on said housing, one of said antennas having its longitudinal axis disposed in a direction substantially normal to one lane of traffic, the second of said antennas having its longitudinal axis disposed in a direction substantially normal to a second interfering lane of traffic, the position of the axes of said antennas being a factor in effecting discrimination in direction of signalling in favor of traffic on one or the other of said lanes of traffic, and electric wave signalling apparatus electrically connected with said antennas and disposed adjacent thereto.

6. In a traffic signalling system for effecting directional electric wave signalling along the surface of interfering lanes at a traffic intersection, an antenna structure comprising a housing having antenna supporting means thereon, a pair of directional antennas mounted thereon, said antennas having their major axes extending in a horizontal plane at an angle of substantially ninety degrees with respect to each other, radio apparatus disposed within said housing, and relay switching means for sequentially connecting one or the other of said antennas to said radio apparatus to effect discrimination in direction of signalling in favor of traffic in one or the other of said interfering traffic lanes.

7. In a traffic signalling system for effecting directional electric wave signalling at the surface of interfering traffic lanes at a traffic intersection, an antenna structure comprising a housing having insulated antenna supporting means thereon, a pair of horizontal dipole antennas mounted on said housing and extending substantially at an angle of ninety degrees with respect to each other, radio signalling apparatus disposed adjacent to said housing in fixed relationship thereto, and relay means for electrically connecting said radio signalling apparatus with either of said antennas for effecting discrimination in direction of signalling along either of said interfering lanes.

8. In a traffic signalling system for effecting directional electric wave signalling along the surface of a roadway lane of traffic, a roadside signal transmitter disposed in an apparatus housing adjacent the lane of traffic in which electric wave signalling is to be established, said transmitter comprising a carrier wave generator having signal modulating means connected thereto, an antenna head having antenna supporting means thereon, said antenna head being disposed at an elevated position with respect to the surface of said traffic lane, and a directional antenna mounted on said antenna head, said antenna being electrically connected with said carrier wave generator and disposed to effect production of a directional radiation pattern having a major lobe extending substantially in the direction of said traffic lane and towards approaching traffic on said lane.

WILLIAM S. HALSTEAD.